No. 697,010. Patented Apr. 8, 1902.
J. PFEIFFER.
MUD GUARD FOR VEHICLES.
(Application filed Nov. 29, 1901.)

(No Model.)

Attest:
M. B. Smith.
M. D. Phillips.

Inventor:
Jacob Pfeiffer
By E. B. Whitmore, Atty.

THE NORRIS PETERS CO., PHOTO-LITHO., WASHINGTON, D. C.

UNITED STATES PATENT OFFICE.

JACOB PFEIFFER, OF ROCHESTER, NEW YORK.

MUD-GUARD FOR VEHICLES.

SPECIFICATION forming part of Letters Patent No. 697,010, dated April 8, 1902.

Application filed November 29, 1901. Serial No. 84,112. (No model.)

*To all whom it may concern:*

Be it known that I, JACOB PFEIFFER, of Rochester, in the county of Monroe and State of New York, have invented a new and useful Improvement in Mud-Guards for Vehicles, which improvement is fully set forth in the following specification and shown in the accompanying drawings.

My invention is a mud-guard for vehicles, as bicycles and automobiles, the same being hereinafter fully described, and more particularly pointed out in the claim.

The objects and advantages of the invention will be brought out and made to appear in the following specification, reference being had to the accompanying drawings, forming a part thereof.

Figure 1:
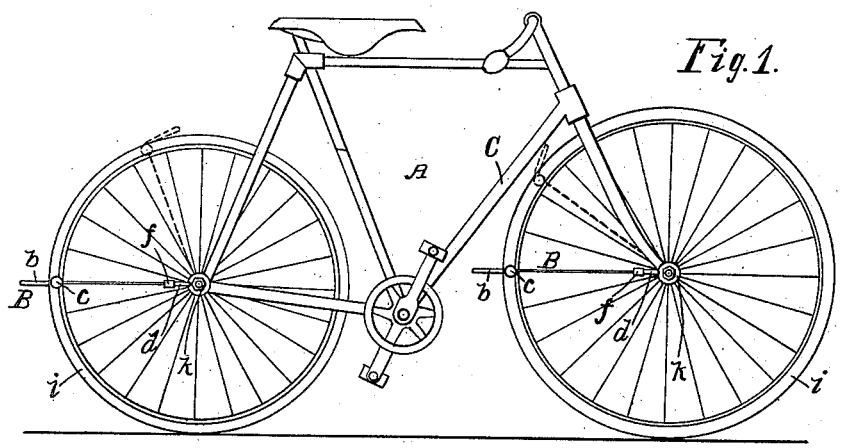
Figure 2:
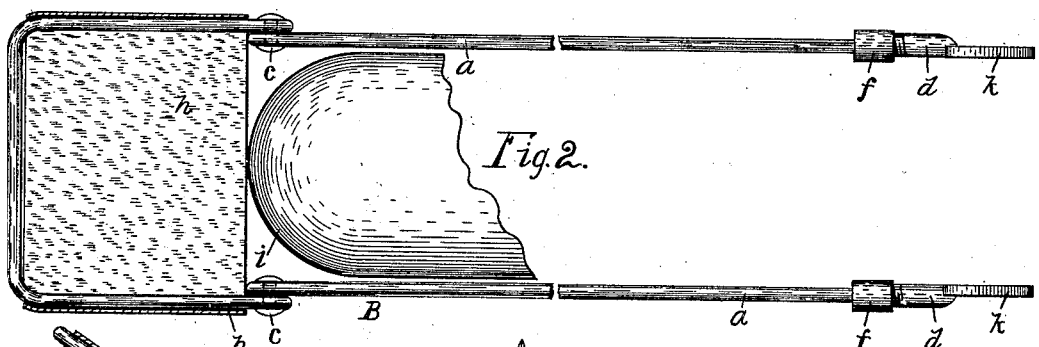
Figure 3:
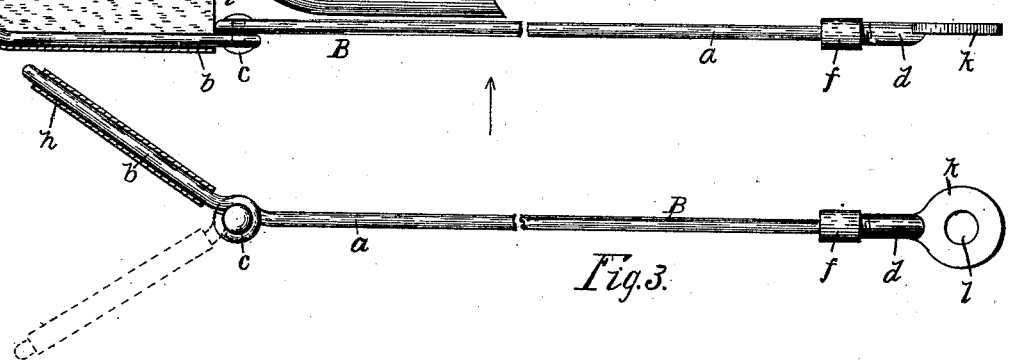
Figure 4:
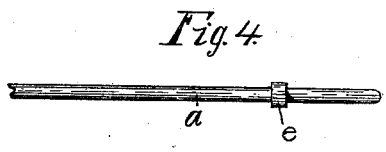
Figure 5:
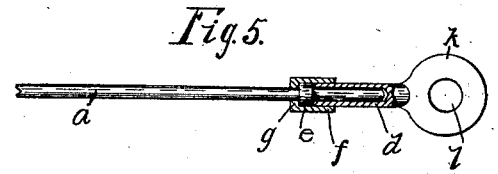

Figure 1 shows, in small scale, a bicycle with my improved mud-guard attached in place. Fig. 2 is a plan of the guard with parts broken out and the web longitudinally sectioned. Fig. 3 is a side view, indicated by arrow in Fig. 2, the web being sectioned along one member of the frame. Fig. 4 shows detail of construction of the coupling end of the frame. Fig. 5 shows parts coupled together, the socket or rest and the coupling-band being longitudinally sectioned.

In the drawings, A is a bicycle of ordinary construction, B being my improved mud-guard. This device comprises a metal frame consisting of two equal parallel legs $a\ a$, one on either side of the wheel, and a U-shaped part or head $b$, joined pivotally to the legs at $c\ c$, the legs being preferably on the inside of the head, as shown.

$d\ d$ are threaded sockets or rests adapted to receive within them longitudinally the free ends of the legs, as clearly shown in Fig. 5. The legs are equal and substantially parallel, being formed with rigid collars $e\ e$, which when the parts are put together abut squarely against the respective ends of the rests or sockets, as shown. Internally-threaded cup-shaped parts or bands $f\ f$ are provided for the legs, to screw on over the ends of the sockets $d\ d$, the inner faces of the bottom parts $g$ of the bands pressing the surfaces of the collars, as shown, serving to hold the legs firmly in place in the respective sockets.

A thin member or sheet $h$, as of india-rubber or other suitable fibrous material, is stretched taut across the head $b$, the inner edge of which is tangent with the tire $i$ of the wheel. The sockets $d\ d$ are formed at their extreme ends into thin circular washers $k\ k$, the inner faces of which being in line with the adjacent sides of the cylindrical threaded parts of the rests. These sockets are offset outwardly, as seen in Fig. 2, to provide room for the bands $f\ f$ to throw the latter away from the wheel, and thus avoid all danger of contact of the said bands and wheel. The washers are centrally perforated at $l\ l$ to receive through them the ends of the axle of the hub, the screw-nuts at the ends of the axle being turned against the outside faces of the washers.

These mud-guards are adapted to be placed on either wheel of the bicycle and to be swung to any position above or below horizontal lines when on the wheels, the sockets or rests $d\ d$ turning in vertical planes on the axle. Furthermore, the head $b$ may be turned to form any angle with the plane of the legs $a\ a$, as found convenient or necessary to best ward off the sprays of mud and water carried up by the revolving wheels. When not needed, the heads $b$ may be folded forward over the respective wheels of the bicycle, the one on the forward wheel turning under the frame C when folded, as shown by dotted lines in Fig. 1. The guard when not used may also be removed bodily from the bicycle by turning the bands $f\ f$ off from the sockets, the latter remaining permanently with the bicycle and the bands remaining permanently with the frame of the guard.

The web $h$, holding to place on the head $b$ by friction, may be slipped forward or back thereon to adjust its position with reference to the tire $i$ of the wheel. The head $b$ when the guard is in place on the vehicle extends outwardly beyond the periphery of the wheel, as shown.

What I claim as my invention, and desire to secure by Letters Patent, is—

A mud-guard for vehicles, comprising screw-threaded socketed rests with apertures to fit over the axle of a vehicle, said rests being offset outwardly from the apertured portions, a frame consisting of legs and a pivoted head, the legs being formed with collars and the ends of the legs being fitted in the sockets with the collars bearing against the ends of the rests, and cup-shaped couplings sleeved on the said legs and engaged with the collars and screwed on the ends of the rests, all substantially as shown and described.

In witness whereof I have hereunto set my hand, this 23d day of November, 1901, in the presence of two subscribing witnesses.

JACOB PFEIFFER.

Witnesses:
ENOS B. WHITMORE,
MINNIE SMITH.